US011094251B2

(12) United States Patent
Genoe

(10) Patent No.: US 11,094,251 B2
(45) Date of Patent: Aug. 17, 2021

(54) CODING FOR AVOIDING MOTION ARTIFACTS

(71) Applicant: IMEC VZW, Leuven (BE)

(72) Inventor: Jan Genoe, Testelt (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/722,672

(22) Filed: Dec. 20, 2019

(65) Prior Publication Data

US 2020/0202773 A1 Jun. 25, 2020

(30) Foreign Application Priority Data

Dec. 21, 2018 (EP) .................................... 18215658

(51) Int. Cl.

*G06F 3/038* (2013.01)
*G09G 5/00* (2006.01)
*G09G 5/10* (2006.01)
*G09G 3/3225* (2016.01)
*G09G 3/3275* (2016.01)

(52) U.S. Cl.

CPC ......... *G09G 3/3225* (2013.01); *G09G 3/3275* (2013.01); *G09G 2310/0286* (2013.01); *G09G 2310/08* (2013.01); *G09G 2320/0266* (2013.01)

(58) Field of Classification Search

CPC ........................... G09G 3/2022; G09G 3/2025
See application file for complete search history.

(56) References Cited

U.S. PATENT DOCUMENTS 9,905,159 B2 2/2018 Genoe
2015/0302795 A1* 10/2015 Genoe ................. G09G 3/3233 345/691

OTHER PUBLICATIONS

European Search Report, European Patent Application No. 18215658.8, dated Mar. 1, 2019, 9 pages.
Yamamoto, T. et al., "Method to Improve Moving Picture Quality of PDPs Affected by Dynamic False Contour Artifacts", SMPTE Journal, vol. 4, No. 10, Apr. 2001, pp. 248-256.

* cited by examiner

*Primary Examiner* — Nan-Ying Yang
(74) *Attorney, Agent, or Firm* — McDonnell Boehnen Hulbert & Berghoff LLP

(57) ABSTRACT

A method includes representing dots of an image to be displayed within a field by a digital image code. The field is divided into sub-fields which are further divided into a first and second time interval which respectively comprise a first and a second number of equally long time slots. Time slots are assigned to each bit of the digital image code according to each bit's significance. Successive time slots of the first time interval are assigned to one of the bits of the image code and successive time slots of the second time interval are assigned to a different one of the bits of the image code. Within the duration of at least one sub-field, each rows is selected twice for respectively writing a first bit of the image code during the first time interval and writing a second bit of the image code during the second time interval.

20 Claims, 9 Drawing Sheets

CODING FOR AVOIDING MOTION ARTIFACTS

CROSS-REFERENCE TO RELATED APPLICATIONS

The present application is a non-provisional patent application claiming priority to European Patent Application No. 18215658.8, filed Dec. 21, 2018, the contents of which are hereby incorporated by reference.

FIELD OF THE DISCLOSURE

The present disclosure relates to the technical field of driving techniques for displays and in particular to display driving techniques for reducing motion artifacts.

BACKGROUND

Active-matrix display panels such as, but not limited to, AMOLED display panels, are often subfield-driven, using a sequences of digital pulses having individually modulated lengths. Fast moving objects on these impulse-driven displays can introduce motion artifacts, which negatively impacts the viewing experience for such displays. Current display driving techniques try to solve this problem by increasing the refresh rates so as to obtain satisfactory smooth motion estimation for the fast moving objects. However, increasing the frame rate of a digitally driven display requires higher performances for the transistors used to control and update the content of the displayed fields or frames.

Higher refresh rates can be combined with the insertion of additional fields that are obtained by interpolation between two subsequently received fields or frames. This reduces motion blur to some extent but it requires more image processing, which can increase the input lag.

Another potential solution to the problem of motion artifacts is to insert additional black fields. A similar effect can be obtained for active-matrix LCD display panels, for instance, by strobing or scanning the backlight. These techniques can have the disadvantage that the average light output for the displayed fields or frames is reduced and the displayed image content is perceived darker. The resulting dimming of displayed content, sometimes accompanied by an increased image flicker, can be tiring for the spectator's eye or cause viewing discomfort. An increase in the brightness of the driven display pixels is necessary to compensate for the additional black intervals.

A particular motion artifact is caused by the human eye tracking when following the trajectory of moving objects on the display. Impulse-driving techniques often lead to the perception of dynamic false contours and, related thereto, color splitting and banding.

In Yamamoto et al. "Method to Improve Moving Picture Quality of PDPs Affected by Dynamic False Contour Artifacts," SMPTE Journal, vol. 4, issue 10, April 2001, the problem of dynamic false contour artifacts is discussed in the context of plasma display panels. It is proposed to compress in time the light emission events (on-periods) of digitally driven display pixels, which were found to be scattered over the entire field period. This has a similar effect as strobing and only partially alleviates the problem, because it reduces the perceived spatial extent of the false contours, but not their amplitudes. Therefore, it has been suggested to divide the two most significant bits (upper signal bits), which are used for driving a display pixel of the panel, into four sub-fields. Furthermore, an adaptive sub-field control for selecting between alternative light emission patterns is used to improve the perceived quality of moving pictures. The proposed embodiment systematically leads to large off-periods in each field during which the addressed display pixel is not emitting light, i.e. stays dark. The low overall duty cycle is inefficient in terms of the amount of data that is effectively transferred to the addressed display pixel during this field period and a proliferation of the number of sub-fields for driving encounters the difficulty of having to deal with large drive speed. This is particularly the case for displays capable of reproducing larger color depths, e.g. more scales of gray.

Therefore, improved methods for digitally driving active-matrix displays and successfully avoiding motion artifacts are desirable, especially in respect of an increasing number of scales of gray to be displayed.

SUMMARY

It is a potential benefit of embodiments of the present disclosure to reduce motion artifacts in moving image sequences displayed on a digitally driven active-matrix display, and corresponding driving circuitry.

In a first aspect, the disclosure relates to a method for reducing motion artifacts in moving image sequences displayed on a digitally driven active-matrix display which comprises a plurality of display pixels that are logically organized in a plurality of rows and a plurality of columns. The method comprises representing each of the plurality of dots of an image to be displayed within a field by an n-bit digital image code. Next, the field is divided into a plurality of sequential, time-ordered sub-fields and each sub-field is further divided into a first time interval and a second time interval which are respectively comprising a first number and a second number of equally long time slots. Then a number of time slots is assigned to each bit of the n-bit digital image code according to each bit's significance in the digital image code. The assignment is such that, for each sub-field, successive time slots of the first time interval are assigned to one of the bits of the digital image code, which is to be written during the first time interval of the sub-field, and successive time slots of the second time interval are assigned to a different one of the bits of the digital image code, which is to be written during the second time interval of the sub-field. Furthermore, within the duration of at least one sub-field, each of the plurality of rows is sequentially selected twice, wherein upon a first selection a first bit of the digital image code is written to the selected row during the first time interval and upon a second selection a second bit of the digital image code, different from the written first bit of the digital image code, is written to the selected row during the second time interval. There exists a predetermined time delay between moments of first and second selection. Moreover, at least the most significant bit of the n-bit digital image code is written during time intervals which are substantially regularly distributed over the sub-fields comprised in one field.

The n-bit digital image code may assign a binary string/number to each luminance or brightness level to be displayed at individual display pixel locations, yielding different scales of gray. Each color channel may be driven separately by a corresponding color-field. The number of bits n in the digital image code may be equal to or larger than four bits, e.g. between four bits and twelve bits, or more. A higher number of bits n for the digital image code generally improves the color quality and nuances the display is capable to reproduce, but requires more performant driver circuitry.

According to some embodiments of the disclosure, the rows may be selected twice for a plurality of sub-fields, which is beneficial for an improved distribution of at least the most significant bit.

According to embodiments of the disclosure, the first most significant bit and the second most significant bit or the first most significant bit, second most significant bit and third most significant bit of the n-bit digital image code may each be written during time intervals which are substantially regularly distributed over the sub-fields comprised in one field. This allows for an even better suppression of motion artifacts.

In some embodiments of the disclosure, the first most significant bit of the digital image code may be written during time intervals associated with more than 50% of the sub-fields comprised in one field and/or the second most significant bit of the digital image code may be written during time intervals associated with at least 25% of the sub-fields comprised in one field.

The delay between the first selection and the second selection in the at least one sub-field may be equal to or less than the delay between the first selection and the second selection in any further subsequent sub-field. Additionally, the second number of time slots in the second interval of at least one sub-field may be zero and only one bit of the digital image code might be written during the at least one sub-field. This can be of advantage in embodiments in which two cyclic row pointers (e.g. cyclic running 'ones') are provided and delayed with respect to each other for selecting the rows upon the first selection and the subsequent second selection in the at least one sub-field, because these row pointers cannot cross each other. An increasing delay is one possibility to ensure that the row pointers are not crossing. If a second interval has zero duration, the delayed row pointer may skip one sub-field during which it may be reset.

The number of sub-fields comprised in one field may equal a power of two. Each sub-field may also comprise an equal number of time slots. This simplifies the complexity and timing requirements related to the driving circuitry of the display.

According to embodiments of the disclosure, writing the first bit of the n-bit digital image code during the first interval and writing the second bit of the n-bit digital image code during the second interval may comprise driving the bits using pulse-width modulation.

In a second aspect the disclosure relates to a digital driver circuitry for driving display pixels of an active-matrix display arranged in rows and columns. The digital driver circuitry comprises a digital row select driver for sequentially selecting each one of a plurality of rows for each sub-field in a plurality of sub-fields comprised in a field to be displayed at a first time and for sequentially selecting each one of a plurality of rows for at least one sub-field at a second time. There exists a delay between a first selection of a row at the first time and a second selection of that same row at the second time. A digital column data driver for writing bits of an n-bit digital image code to corresponding display pixels of a selected row is also included in the driver circuitry. The digital column data driver is configured for writing a first bit of the n-bit digital image code during a first interval upon a first selection of a row and a second bit of the n-bit digital image code, different from the written first bit, upon a second selection of that same row. Furthermore, the driver circuitry comprises a controller for synchronizing the digital row select driver and the digital column data driver. The controller is adapted for generating the first bit of the digital image code to be written within each sub-field or for generating the first bit and second bit of the digital image code to be written within the at least one sub-field of the field in such a way that time intervals for writing at least a most significant bit of the digital image code are substantially regularly distributed over the sub-fields comprised in one field.

The digital row select driver of the driver circuitry may comprise at least two shift registers or at least two linear arrays of clocked flip-flops.

It is a potential advantage of embodiments of the disclosure related to driver circuitry that drivers can be merged, which gives rise to an important cost and complexity reduction for the related active-matrix display panel.

In yet another aspect, the disclosure relates to an active-matrix display comprising a plurality of display pixels, arranged in rows and columns, and one of the digital driver circuitry embodiments of the second aspect of the disclosure and a plurality of row bitlines and data bitlines. Each display pixel is connected to one of the row bitlines and to one of the data bitlines. The digital driver circuitry is connected to the each of the plurality of row bitlines and each of the plurality of data bitlines.

Particular aspects of the disclosure are set out in the accompanying independent and dependent claims. Features from the dependent claims may be combined with features of the independent claims and with features of other dependent claims as appropriate and not merely as explicitly set out in the claims.

The above and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

Figure 1:
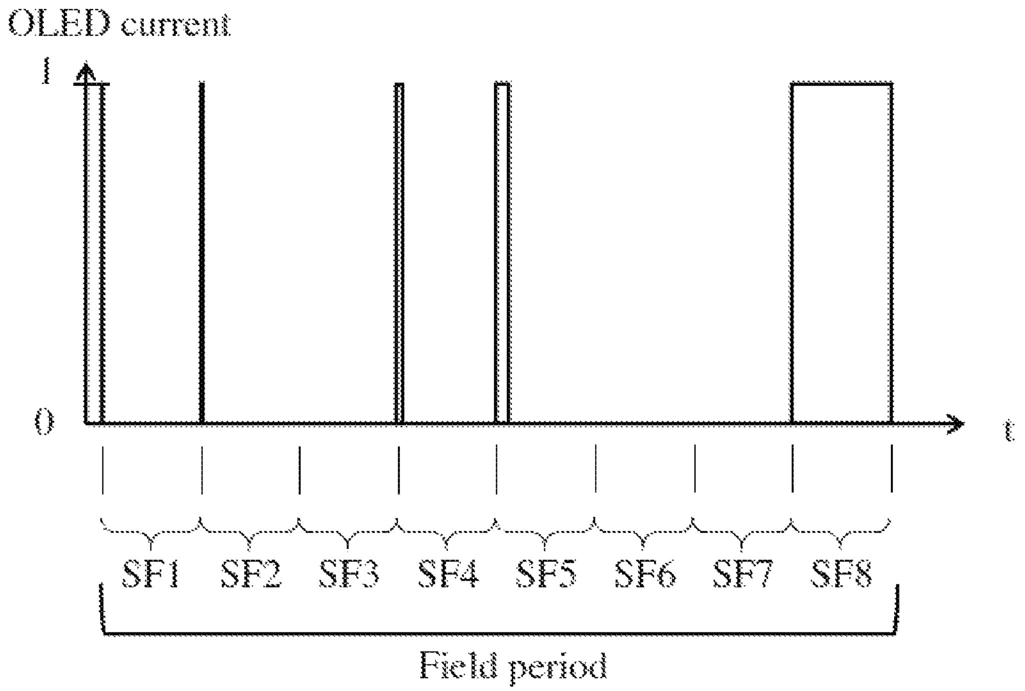
FIG. 1 is an illustration of a digital driving method for active-matrix displays, according to an example embodiment.

The drawings are schematic and are non-limiting. In the drawings, the size of some of the elements may be exaggerated and not drawn to scale for illustrative purposes. The dimensions and the relative dimensions do not necessarily correspond to actual reductions to practice of the disclosed embodiments.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

It is to be noticed that the term "comprising," used in the claims, should not be interpreted as being restricted to the features listed thereafter; it does not exclude other features. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Definitions

OLED displays are displays comprising an array of light-emitting diodes as display pixels in which the emissive electroluminescent layer is a film of organic compound which emits light in response to an electric current. OLED displays can either use passive-matrix (PMOLED) or active-matrix (AMOLED) addressing schemes. In case of OLED displays, the present disclosure relates to AMOLED displays. The corresponding addressing scheme makes use of a thin-film transistor backplane to switch each individual OLED display pixel on or off. AMOLED displays allow for higher resolution and larger display sizes than PMOLED displays.

The present disclosure, however, is not limited to AMOLED displays, but in a broader concept relates to active matrix displays. Any type of active matrix displays, including plasma display panels or digital mirror devices, may use the concepts of embodiments of the present disclosure, although AMOLED displays can be particularly advantageous in view of the current switching speeds of their pixel elements. It can be advantageous if the pixel elements of the active matrix displays can switch faster, as this can facilitate obtaining higher frame rates and less flickering images.

An active matrix display, e.g. an AMOLED display, according to embodiments of the present disclosure comprises a plurality of display pixels, each comprising a light-emitting pixel element, e.g. an OLED element. The light-emitting pixel elements are arranged in an array, and are logically organized in rows and columns. Throughout the description of the present disclosure, the terms "horizontal" and "vertical" (related to the terms "row" of "line" and "column," respectively) are used to provide a coordinate system and for ease of explanation only. They do not need to, but may, refer to an actual physical direction of the device. Furthermore, the terms "column" and "row" or "line" are used to describe sets of array elements which are linked together. The linking can be in the form of a Cartesian array of lines and columns; however, the present disclosure is not limited thereto. Also non-Cartesian arrays may be constructed and are included within the scope of the disclosure. For example, the rows may be circles and the columns radii of these circles and the circles and radii are described in this disclosure as "logically organized" rows and columns. Accordingly, the terms "row" or "line" and "column" should be interpreted widely. Also specific names of the various lines, e.g. select line and data line, are intended to be generic names used to facilitate the explanation and to refer to a particular function and this specific choice of words is not intended to in any way limit the disclosure.

In the context of the present disclosure, a frame refers to a single image or picture that is shown as part of a sequence of motion pictures, for instance in video, movie or TV. The frame rate is the rate at which consecutive complete images (frames) are received and displayed. The frame period is a time interval equal to the reciprocal of the frame rate. It is common for video signals to sample motion at 60 Hz but this sampling is only performed for half-resolution images. This is known as interlacing and the half-resolution images composing the full frame are referred to as fields. Fields may also designate the separate color channels in a composite video signal, for instance to the three RGB color images which, when displayed sequentially on the display, form a complete frame. Therefore, it is possible to have a field rate which is a multiple of the frame rate. In the context of the present disclosure, an image that is to be formed on the display, may it be a full frame or a part of a decomposed full frame, will be referred to as field. A field itself can be divided into a sequence of sub-fields.

The refresh rate refers to the rate at which the display panel is repeatedly forming one and the same field. For example, movie projectors running at 24 frames per second (fps) may show the same field (e.g. frame) two or three times before advancing to the next field. Accordingly, the refresh rate would be 48 Hz or 72 Hz.

A digital image code, in the context of the present disclosure, refers to a finite set of code symbols which are used to represent a set of possible luminance values of a dot in a field that ought to be reproduced by a display pixel on the active-matrix display panel when addressed and driven by a corresponding symbol of that code. The luminance values to be reproduced by a display pixel of the panel are typically described in terms of scales of gray, knowing that a white appearance of a display pixel generally requires the contribution of three distinct scales of gray, e.g. each one associated with a separate color channel (e.g. RGB). The digital code can be a binary code for which code symbols are taking one of the values 'one' or 'zero' and a scale of gray in this binary code is simply represented by its binary string/number representation.

In analog display driving methods for active-matrix displays, each display pixel is addressed once per field update and remains active, e.g. is emitting light, throughout the full field period. For AMOLED display panels this means that the driving current for the light-emitting pixel element, e.g. the OLED, has to be precisely set, so as to obtain the desired scale of gray at the location of the addressed display pixel.

In contrast, digital display driving methods using pulse width modulation rapidly drive the light-emitting pixel element at the addressed display pixel location, e.g. the OLED, with a pulse sequence, wherein each pulse of the sequence is characterized by only one of two possible pulse heights: an on-level and an off-level. In consequence, to achieve the desired scale of gray at the location of the addressed display pixel different pulses with different lengths are used. The different timing moments to drive a display pixel by a pulse of the sequence of pulses are grouped into sub-field, which together form a field (e.g. frame). A new driving pulse is marking the start of a new sub-field and the length of each new driving pulse corresponds to only a portion (e.g. the on-period) of the sub-field period which has been allocated for driving that pulse. This provides a weighting scheme according to which a scale of gray for the addressed display pixel is represented by the sum of on-periods over all the sub-fields. This is illustrated in FIG. 1, which shows how an eight bit binary gray code "11011001" (e.g. representing a decimal gray scale value 217) for driving of a display pixel is encoded as a pulse sequence over eight sub-fields, the sub-fields all lasting a same period of time (e.g. for a predetermined sub-field period). It can be seen that the digital driving method used in FIG. 1 results in a poor overall duty cycle. Addressed and driven display pixels will be off over a significant portion of the field period. Moreover, at increasing gray scale depth, i.e. using more bits (longer code symbols) to represent a larger number of different scales of gray, the precise timing of the individual pulses according to this driving method becomes increasingly challenging and also requires faster row cycling, e.g. faster driving circuitry, which has a negative impact on the power consumption and the heat dissipation caused thereby may also degrade the OLED's lifetime.

Another problem using the known digital driving methods for active-matrix displays has been described by researchers and observed in practice for sub-field driven display technologies, e.g. for plasma display panels. The problem faced is that of motion artifacts which are caused by human eye-tracking, including phenomena like motion blur, dynamic false contours, color splitting and banding, etc.

Figure 2:
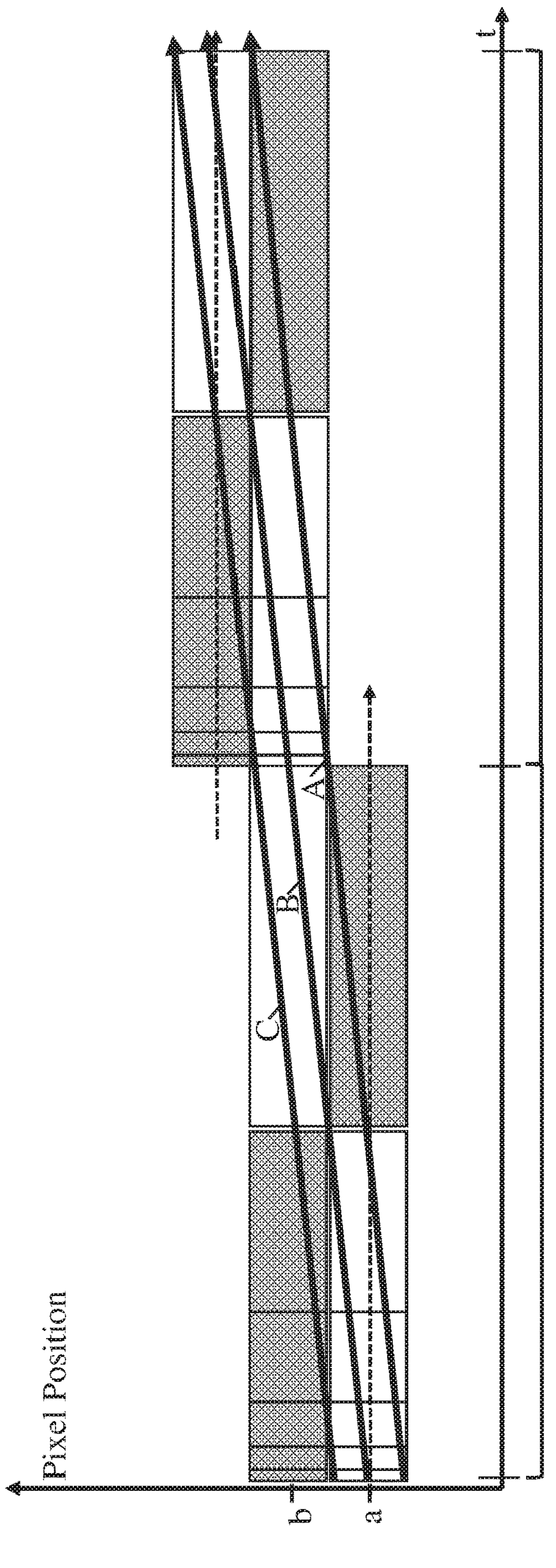
FIG. 2 is a diagram depicting the emergence of dynamic false contours when looking at the displayed contents of moving fields if field content is displayed by conventional digital driving methods for active-matrix displays, according to an example embodiment.

FIG. 2 explains in more detail how dynamic false contours emerge when the observer's eyes are tracking the movement of generally bright objects on the display. An amplitude for the observed motion artifact of false contours has been revealed to be proportional to a luminance/brightness value reproduced by a display pixel, hence is more pronounced and causing more viewing discomfort for brighter objects. Referring to FIG. 2, two neighboring display pixels (e.g. adjacent pixels in a row) at their respective positions 'a' and 'b' are represented on the vertical axis by their corresponding digital image code used for driving, here for instance a 6-bit digital image code to distinguish and control a total of 64 scales of gray. The 6-bit digital image code for the display pixel at position 'a' corresponds, in this example, to an encoded scale of gray (g) that has a decimal value of g=31, whereas the 6-bit digital image code for the neighboring display pixel at position 'b' corresponds to an encoded scale of gray g=32. In this example, scales of gray g are achieved by adding the on-periods (white boxes) of all sub-fields (all boxes, i.e. white and shaded boxes) comprised in one field. Hence, there is a smooth gradient of or transition between represented scales of gray, which needs to be displayed by the two neighboring display pixels of the active-matrix display. This smooth transition does not change when stepping from one field (e.g. Field 1) to the subsequent field (e.g. Field 2), as reported on the horizontal time axis (t) of FIG. 2. However, it is noted that the described light emission pattern is shifted along an axis through the two display pixels when stepping from one field to the next field, e.g. a horizontal movement along a row of the display. At present, this shift occurs at a translational speed of one pixel per field period but this is not a requirement; translational speed much faster than this can be tracked by the eyes. An observer watching the moving scene, e.g. the shifting smooth transition between two neighboring display pixels, unwillingly interpolates and anticipates a continuous trajectory for the emitted light signals, starting at positions 'a' and 'b' at the beginning of the first field and ending at the translated positions, e.g. shifted by one display pixel on the display, at the end of the subsequent field. The eye movement is scanning along virtual lines between these two configurations, e.g. along the indicated gaze vectors A, B and C in FIG. 2, but the light-emission events at the display remain localized at the two neighboring display pixels for the duration of a full field period and then the light emission pattern is repeated at an abruptly changed location during the next full field period. Whereas an observer looking at the two fields as still images (e.g. viewing along dashed arrows in FIG. 2) would correctly perceive the two scales of gray, e.g. g(a)=31 and g(b)=32, an observer looking at the moving fields integrates the emitted light for the on-periods along the gaze vectors A, B, and C due to eye-tracking. In consequence, this observer would perceive an integrated value for the scale of gray, which for the gaze vector A equals g(A)=31, for the gaze vector B equals g(B)=63 and for gaze vector C equals g(C)=32. As a result, the smooth transition between scales of gray, as it would be presented by the display in each still field, has a non-smooth appearance when looking at the two fields as moving pictures. Now, a bright false contour is dynamically perceived between the two adjacent scales of gray. It is also deduced that the magnitude of the false contour, g(B)−g(A)=32, coincides with one of the scales of gray displayed by the neighboring display pixels, e.g. is proportional to the displayed signal. It is understood that the upper signal bits used for driving, e.g. the most significant bit (MSB) in the digital image code, are affecting the perceived moving image quality most.

In a first aspect the disclosure relates to a method for reducing motion artifacts in moving image sequences displayed on a digitally driven active-matrix display comprising a plurality of display pixels. The display pixels are logically organized in a plurality of rows and a plurality of columns. The method comprises the steps of a) representing each of the plurality of dots of an image to be displayed within one field by an n-bit digital image code. The image dots to be displayed are generally reproduced by one or more light-emitting elements, e.g. OLEDS, which are included in each display pixel of the matrix/array. A representation thereof may be in terms of scales of gray in respect of one or more color channels/fields. The n-bit digital image code may be a binary number representation of a scale of gray, e.g. an 8-bit wide binary representation for each one of the plurality of scales of gray in the range 0 to 255. In a next step b) the field is divided into a plurality of sub-fields and each sub-field is further divided into equally long time slots. The duration of one time slot may be limited by the fundamental switching speed for the display pixel comprising the one or more light-emitting elements. In a following step c) a number of time slots is assigned to each bit of the n-bit digital image code according to each bit's significance in the digital image code, e.g. 128 time slots may be assigned to the MSB and only a single time slot to the LSB in an 8-bit image code. The first portion of successive, assigned time slots in each sub-field forms a first digital code symbol associated with one of the n bits of the digital image code, which is to be written during the corresponding first time interval of that sub-field. The remaining second portion of successive, assigned time slots in the sub-field forms a second digital code symbol associated with a different one of the n bits of the digital image code, which is to be written during the corresponding first time interval of that sub-field. For instance, the single time slot assigned to the LSB is corresponding to the first time interval and is located at the beginning of the second sub-field SF 2; for a total of eight sub-fields comprised in one field and each subfield comprising 32 time slots. Therefore, a code symbol "A", associated with the LSB (e.g. a digital pulse level taking one of an on-level or off-level for driving a display pixel), is to be written during the second sub-field SF 2. Likewise, the 128 time slot assigned to the MSB may be located in the first or second time intervals of the sub-fields SF 1 to SF 3, SF 5 and SF 7. Therefore, a code symbol "H", associated with the MSB (e.g. a digital pulse level taking one of an on-level or off-level for driving a display pixel), is to be written during these sub-fields. The code symbols associated with a same bit that are located in different sub-fields may be formed from a different number of assigned time slots in that sub-field, e.g. corresponding to different pulse widths used for driving. For such cases one may use index notation for the code symbols, e.g. H(1) or H(7) for the example above, or keep track of the amount of assigned time slots in each sub-field (see fourth columns of Tables further below). The assignment of time slots is such that there are at most two non-overlapping digital code symbols to be written in each sub-field. During driving of the active-matrix display, the method comprises the step d) of sequentially selecting, within the duration of at least one sub-field, each of the plurality of rows twice. Upon a first selection a first digital code symbol is written to the selected row and upon a second selection a second digital code symbol is written to the selected row. There is a predetermined time delay between moments of first and second selection of each row. In embodiments of the disclosure, at least the digital code symbols associated with the most significant bit of the digital image code are substantially regularly distributed over the sub-fields comprised in one field. This may be ensured, for instance, by distributing the code symbols associated with the MSB at substantially regular intervals over the plurality of sub-fields, e.g. assigning time slots in such a way that the code symbols associated with the MSB are to be written for substantially every third sub-field or for every second sub-field of the plurality of sub-fields comprised in one full field. The same may be applied to the code symbols for the second most significant bit, e.g. assigning time slots in such a way that the code symbols associated with the second most significant bit are to be written for substantially every sixth sub-field or for every fourth sub-field of the plurality of sub-fields comprised in one full field, and so forth. Small deviations from a completely regular distribution may occur, e.g. having code symbols associated with the MSB to be written for every third sub-field for a first fraction of the sub-fields and for every second sub-field of the plurality of sub-fields comprised in one full field for a remaining second fraction of sub-fields. In practical embodiments such deviations are tolerated if code symbols associated with the LSBs cannot be cast into the sub-fields without introducing an overlap with the code symbols associated with the MSBs already present in these sub-fields, because assigned first in view of their more pronounced contribution to the false contour amplitudes.

It is a potential advantage of embodiments of the disclosure that the weighting of on-periods for digital driving pulses associated with MSBs of the image code are distributed more regularly across the available number of sub-fields. This scattered distribution of MSBs of the image code significantly reduces the observable false contour amplitudes, i.e. the integrating/averaging effect along gaze vectors yields similar apparent scales of gray if the light emission pattern for the MSBs is more uniformly distributed across the duration of two subsequent fields. Embodiments of the disclosure can be advantageous, because the overall duty cycle is high, meaning that the written data is efficiently transferred without leading to dimming of the display or without needing more light output at the display pixels for compensation. Moreover, a higher duty cycle may allow for a slower drive speed as compared to low-duty cycle digital driving methods or may allow for increased bit-depths for the digital image codes at the same drive speed when compared to low-duty cycle digital driving methods.

Example 1

In this example, the digital image code is an n=4 bits wide binary code, which will be indicated as "DCBA." In this digital image code, the leading symbol "D" denotes the most significant bit (MSB) and the last symbol "A" denotes the least significant bit. Hence, the bit numbering used for the digital image code "DCBA" corresponds to "LSB 0," for which the LSB "A" is assigned to the bit number m=0, the binary symbol B is assigned to the bit number m=1, and so forth. Each field that is received by the active-matrix display is divided into 4 sub-fields (e.g. SF1 to SF4) of equal sub-field period. The whole field is further divided into a plurality of time slots of equal time duration. For this example the plurality of time slots comprises N=16 time slots in total or 4 time slots per sub-field. To each of the time slots is assigned a unique bit number (0-3) or equivalent code symbol (A-D), meaning that the assigned code symbol is driven during that time slot at a display pixel and thus is contributing to the weighting for obtaining a scale of gray that is represented by that code symbol.

Table I enumerates the sub-fields in ascending order in the first column, the corresponding first driven code symbol in the second column and the corresponding second driven code symbol, if any, in the third column. The number of time slots assigned to the first driven code symbol and the second driven code symbol for each sub-field, respectively, are provided in the fourth column.

TABLE I

| Sub-field | First driven code symbol | Second driven code symbol | Assigned number of time slots |
|---|---|---|---|
| SF1 | 0 | D | (1; 3) |
| SF2 | A | D | (1; 3) |
| SF3 | B | D | (2; 2) |
| SF4 | C | / | (4; 0) |

Figure 3:
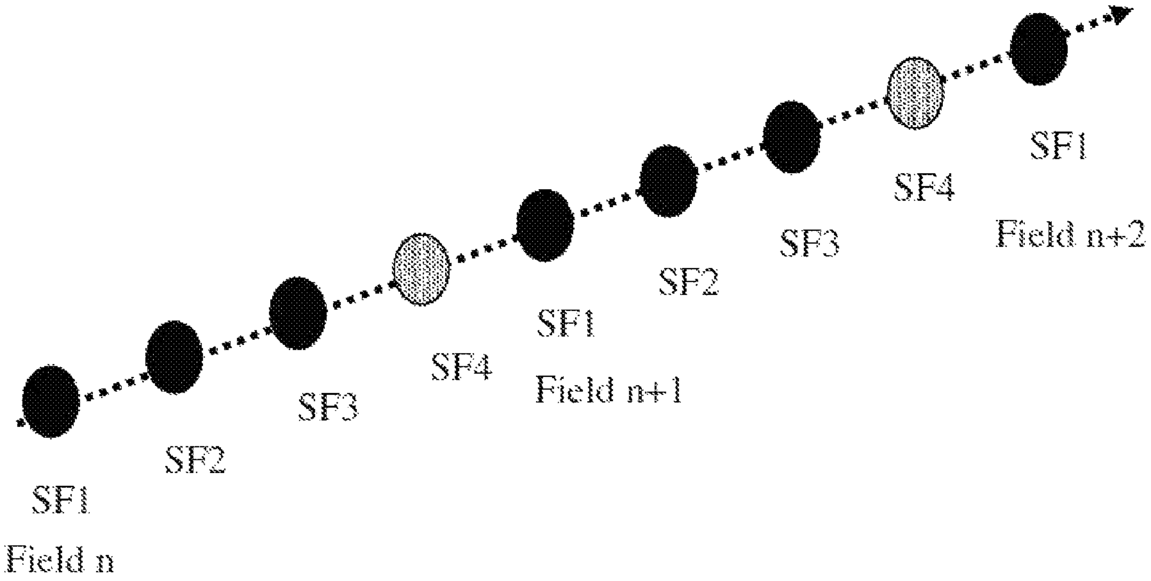
FIG. 3 is a schematic diagram showing a distribution of the bits over the individual sub-fields of a field, using a 4-bit digital image code for driving display pixels, according to an example embodiment.

FIG. 3 shows how the two most significant bits "C" and "D," the two bits of the digital image code that most severely affect the perceived image quality through dynamic false contours in a conventional driving method, are distributed over the different sub-fields SF1-SF4 for each field. More specifically, the bit which is present for each sub-field is shown as a circle. A darker filling pattern of a circle corresponds to a sub-field in which the most significant bit "D" is driven and an intermediate, lighter filling pattern of a circle corresponds to a sub-field in which the second most significant bit "C" is driven. The most significant bit "D" is substantially regularly distributed over the sub-fields in each field, e.g. it is the bit present for every second sub-field at least, and is present in more than 50% of all sub-fields comprised in one field, e.g. is present in 75% of all sub-fields comprised in one field.

Example 2

In this example, the digital image code is an n=5 bits wide binary code, which will be indicated as "EDCBA." In this digital image code, the leading symbol "E" denotes the most significant bit (MSB) and the last symbol "A" denotes the least significant bit. Hence, the bit numbering used for the digital image code "EDCBA" corresponds to "LSB 0," for which the LSB "A" is assigned to the bit number m=0, the binary symbol B is assigned to the bit number m=1, and so forth. Each field that is received by the active-matrix display is divided into 8 sub-fields (e.g. SF1 to SF8) of equal sub-field period. The whole field is further divided into a plurality of time slots of equal time duration. For this example the plurality of time slots comprises N=32 time slots in total or 4 time slots per sub-field. To each of the time slots is assigned a unique bit number (0-4) or equivalent code symbol (A-E), meaning that the assigned code symbol is driven during that time slot at a display pixel and thus is contributing to the weighting for obtaining a scale of gray that is represented by that code symbol.

Table II enumerates the sub-fields in ascending order in the first column, the corresponding first driven code symbol in the second column and the corresponding second driven code symbol, if any, in the third column. The number of time slots assigned to the first driven code symbol and the second driven code symbol for each sub-field, respectively, are provided in the fourth column.

TABLE II

| Sub-field | First driven code symbol | Second driven code symbol | Assigned number of time slots |
|---|---|---|---|
| SF1 | 0 | E | (1; 3) |
| SF2 | A | E | (1; 3) |
| SF3 | B | E | (2; 2) |
| SF4 | D | / | (4; 0) |
| SF5 | E | / | (4; 0) |
| SF6 | D | / | (4; 0) |
| SF7 | E | / | (4; 0) |
| SF8 | C | / | (4; 0) |

Figure 4:
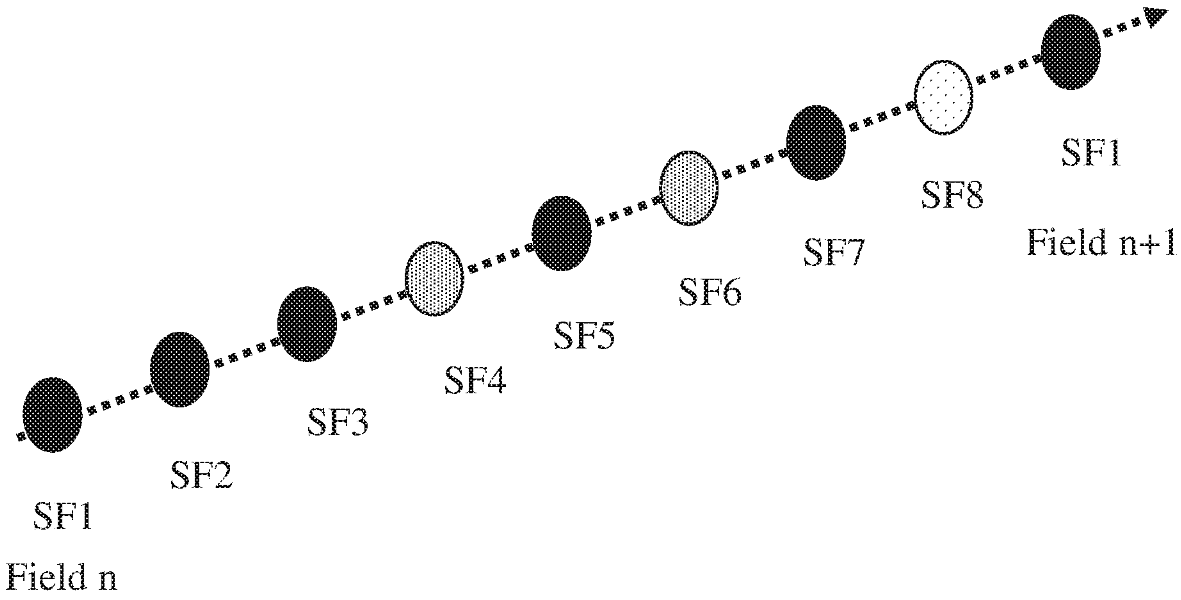
FIG. 4 is a schematic diagram showing a distribution of the bits over the individual sub-fields of a field, using a 5-bit digital image code for driving display pixels, according to an example embodiment.

FIG. 4 shows how the three most significant bits "C," "D," and "E," the three bits of the digital image code that most severely affect the perceived image quality through dynamic false contours in a conventional driving method, are distributed over the different sub-fields SF1-SF8 for each field. More specifically, the bit present for each sub-field is shown as a circle. A darker filling pattern of a circle corresponds to a sub-field in which the most significant bit "E" is driven, an intermediate, lighter filling pattern of a circle corresponds to a sub-field in which the second most significant bit "D" is driven and a very light filling pattern of a circle corresponds to a sub-field in which the third most significant bit "C" is driven. The most significant bit "E" is substantially regularly distributed over the sub-fields in each field, e.g. it is the bit present for every second sub-field at least, and is present in more than 50% of all sub-fields comprised in one field, e.g. is present in 62.5% of all sub-fields comprised in one field. Furthermore, the second most significant bit "D" is present in 25% of all sub-fields comprised in one field.

Example 3

In this example, the digital image code is an n=6 bits wide binary code, which will be indicated as "FEDCBA." In this digital image code, the leading symbol "F" denotes the most significant bit (MSB) and the last symbol "A" denotes the least significant bit. Hence, the bit numbering used for the digital image code "FEDCBA" corresponds to "LSB 0," for which the LSB "A" is assigned to the bit number m=0, the binary symbol B is assigned to the bit number m=1, and so forth. Each field that is received by the active-matrix display is divided into 8 sub-fields (e.g. SF1 to SF8) of equal sub-field period. The whole field is further divided into a plurality of time slots of equal time duration. For this example the plurality of time slots comprises N=64 time slots in total or 8 time slots per sub-field. To each of the time slots is assigned a unique bit number (0-5) or equivalent code symbol (A-F), meaning that the assigned code symbol is driven during that time slot at a display pixel and thus is contributing to the weighting for obtaining a scale of gray that is represented by that code symbol.

Table III enumerates the sub-fields in ascending order in the first column, the corresponding first driven code symbol in the second column and the corresponding second driven code symbol, if any, in the third column. The number of time slots assigned to the first driven code symbol and the second driven code symbol for each sub-field, respectively, are provided in the fourth column.

TABLE III

| Sub-field | First driven code symbol | Second driven code symbol | Assigned number of time slots |
|---|---|---|---|
| SF1 | 0 | F | (1; 7) |
| SF2 | A | F | (1; 7) |
| SF3 | B | F | (2; 6) |
| SF4 | C | F | (4; 4) |
| SF5 | E | / | (8; 0) |
| SF6 | F | / | (8; 0) |
| SF7 | E | / | (8; 0) |
| SF8 | D | / | (8; 0) |

Figure 5:
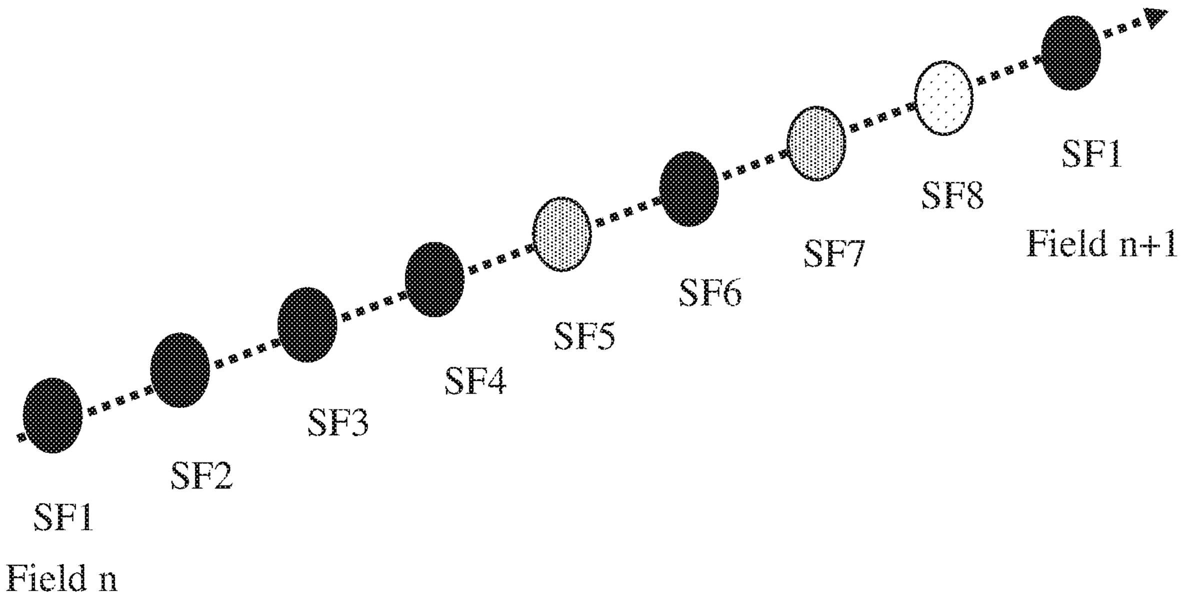
FIG. 5 is a schematic diagram showing a distribution of the bits over the individual sub-fields of a field, using a 6-bit digital image code for driving display pixels, according to an example embodiment.

FIG. 5 shows how the three most significant bits "D," "E," and "F," the three bits of the digital image code that most severely affect the perceived image quality through dynamic false contours in a conventional driving method, are distributed over the different sub-fields SF1-SF8 for each field. More specifically, the bit present for each sub-field is shown as a circle. A darker filling pattern of a circle corresponds to a sub-field in which the most significant bit "F" is driven, an intermediate, lighter filling pattern of a circle corresponds to a sub-field in which the second most significant bit "E" is driven and a very light filling pattern of a circle corresponds to a sub-field in which the third most significant bit "D" is driven. The most significant bit "F" is substantially regularly distributed over the sub-fields in each field, e.g. it is the bit present for every third sub-field at least, and is present in more than 50% of all sub-fields comprised in one field, e.g. is present in 62.5% of all sub-fields comprised in one field. Furthermore, the second most significant bit "E" is present in more than 12.5% of all sub-fields comprised in one field, e.g. is present in 25% of all sub-fields comprised in one field.

Example 4

In this example, the digital image code is an n=7 bits wide binary code, which will be indicated as "GFEDCBA." In this digital image code, the leading symbol "G" denotes the most significant bit (MSB) and the last symbol "A" denotes the least significant bit. Hence, the bit numbering used for the digital image code "GFEDCBA" corresponds to "LSB 0," for which the LSB "A" is assigned to the bit number m=0, the binary symbol B is assigned to the bit number m=1, and so forth. Each field that is received by the active-matrix display is divided into 8 sub-fields (e.g. SF1 to SF8) of equal sub-field period. The whole field is further divided into a plurality of time slots of equal time duration. For this example the plurality of time slots comprises N=128 time slots in total or 16 time slots per sub-field. To each of the time slots is assigned a unique bit number (0-6) or equivalent code symbol (A-G), meaning that the assigned code symbol is driven during that time slot at a display pixel and thus is contributing to the weighting for obtaining a scale of gray that is represented by that code symbol.

Table IV enumerates the sub-fields in ascending order in the first column, the corresponding first driven code symbol in the second column and the corresponding second driven code symbol, if any, in the third column. The number of time slots assigned to the first driven code symbol and the second driven code symbol for each sub-field, respectively, are provided in the fourth column.

TABLE IV

| Sub-field | First driven code symbol | Second driven code symbol | Assigned number of time slots |
|---|---|---|---|
| SF1 | 0 | G | (1; 15) |
| SF2 | A | F | (1; 15) |
| SF3 | B | G | (2; 14) |
| SF4 | C | F | (4; 12) |
| SF5 | F | G | (5; 11) |
| SF6 | D | G | (8; 8) |
| SF7 | G | / | (16; 0) |
| SF8 | E | / | (16; 0) |

Figure 6:
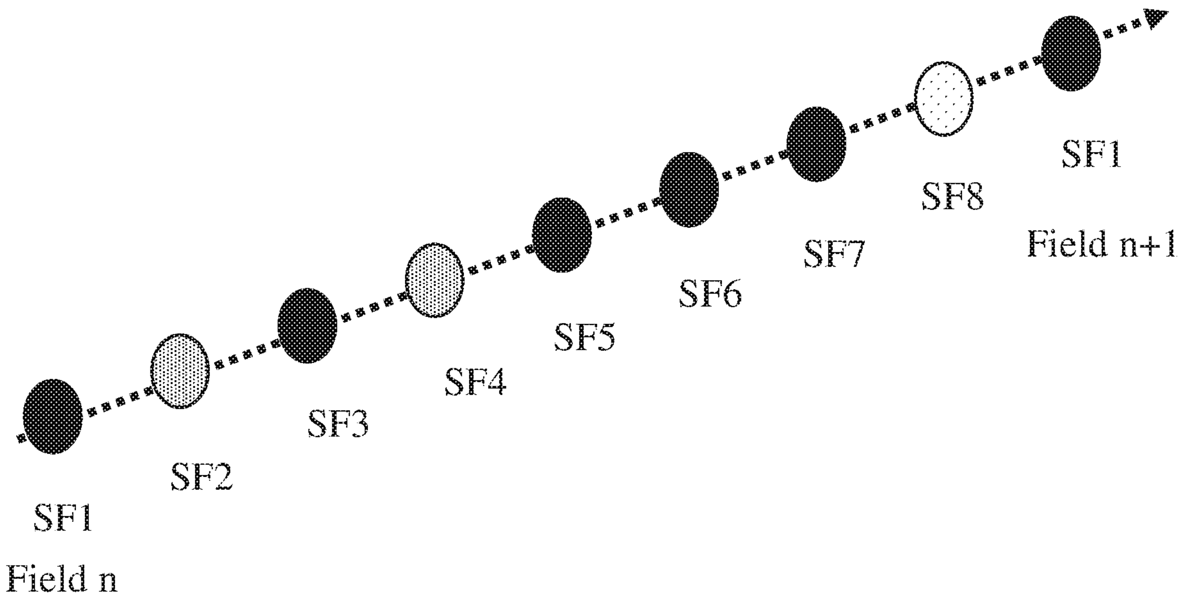
FIG. 6 is a schematic diagram showing a distribution of the bits over the individual sub-fields of a field, using a 7-bit digital image code for driving display pixel, according to an example embodiment.

FIG. 6 shows how the three most significant bits "E," "F," and "G," the three bits of the digital image code that most severely affect the perceived image quality through dynamic false contours in a conventional driving method, are distributed over the different sub-fields SF1-SF8 for each field. More specifically, the bit present for each sub-field is shown as a circle. A darker filling pattern of a circle corresponds to a sub-field in which the most significant bit "G" is driven, an intermediate, lighter filling pattern of a circle corresponds to a sub-field in which the second most significant bit "F" is driven and a very light filling pattern of a circle corresponds to a sub-field in which the third most significant bit "E" is driven. The most significant bit "G" is substantially regularly distributed over the sub-fields in each field, e.g. it is present for every second sub-field at least, and is present in more than 50% of all sub-fields comprised in one field, e.g. is present in 62.5% of all sub-fields comprised in one field. Furthermore, the second most significant bit "F" is present in more than 12.5% of all sub-fields comprised in one field, e.g. is present in 25% of all sub-fields comprised in one field.

Example 5

In this example, the digital image code is an n=8 bits wide binary code, which will be indicated as "HGFEDCBA". In this digital image code, the leading symbol "H" denotes the most significant bit (MSB) and the last symbol "A" denotes the least significant bit. Hence, the bit numbering used for the digital image code "HGFEDCBA" corresponds to "LSB 0," for which the LSB "A" is assigned to the bit number m=0, the binary symbol B is assigned to the bit number m=1, and so forth. Each field that is received by the active-matrix display is divided into 8 sub-fields (e.g. SF1 to SF8) of equal sub-field period. The whole field is further divided into a plurality of time slots of equal time duration. For this example the plurality of time slots comprises N=256 time slots in total or 32 time slots per sub-field. To each of the time slots is assigned a unique bit number (0-7) or equivalent code symbol (A-H), meaning that the assigned code symbol is driven during that time slot at a display pixel and thus is contributing to the weighting for obtaining a scale of gray that is represented by that code symbol.

Table V enumerates the sub-fields in ascending order in the first column, the corresponding first driven code symbol in the second column and the corresponding second driven code symbol, if any, in the third column. The number of time slots assigned to the first driven code symbol and the second driven code symbol for each sub-field, respectively, are provided in the fourth column.

TABLE V

| Sub-field | First driven code symbol | Second driven code symbol | Assigned number of time slots |
|---|---|---|---|
| SF1 | A | H | (1; 31) |
| SF2 | B | G | (2; 30) |
| SF3 | C | H | (4; 28) |
| SF4 | D | H | (8; 24) |
| SF5 | H | G | (14; 18) |
| SF6 | G | E | (16; 16) |
| SF7 | H | 0 | (31; 1) |
| SF8 | F | / | (32; 0) |

Figure 7:
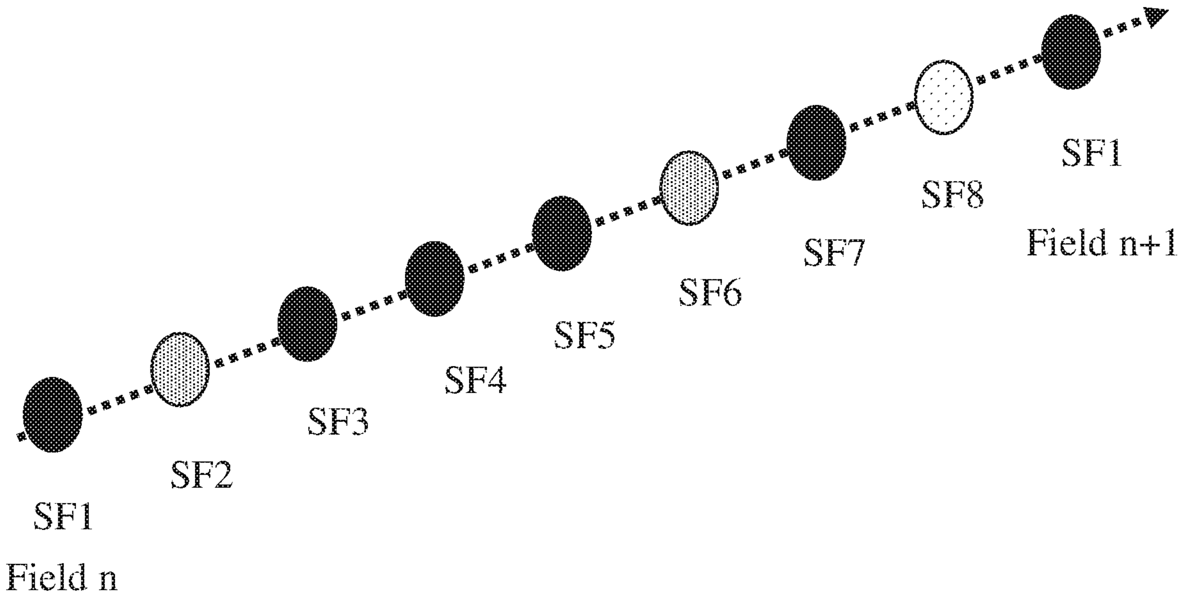
FIG. 7 is a schematic diagram showing a distribution of the bits over the individual sub-fields of a field, using an 8-bit digital image code for driving display pixels, according to an example embodiment.

FIG. 7 shows how the three most significant bits "F," "G," and "H," the three bits of the digital image code that most severely affect the perceived image quality through dynamic false contours in a conventional driving method, are distributed over the different sub-fields SF1-SF8 for each field. More specifically, the bit which is most significant for each sub-field is shown as a circle. A darker filling pattern of a circle corresponds to a sub-field in which the most significant bit "H" is driven, an intermediate, lighter filling pattern of a circle corresponds to a sub-field in which the second most significant bit "G" is driven and a very light filling pattern of a circle corresponds to a sub-field in which the third most significant bit "F" is driven. The most significant bit "H" is substantially regularly distributed over the sub-fields in each field, e.g. it is present for every second sub-field at least, and is present in more than 50% of all sub-fields comprised in one field, e.g. is present in 62.5% of all sub-fields comprised in one field. Furthermore, the second most significant bit "G" is substantially regularly distributed over the sub-fields in each field, e.g. it is present for every fourth sub-field at least, and is present in more than 12.5% of all sub-fields comprised in one field, e.g. is present in 25% of all sub-fields comprised in one field.

Example 6

In this example, the digital image code is an n=12 bits wide binary code, which will be indicated as "LKJIHGFEDCBA." In this digital image code, the leading symbol "L" denotes the most significant bit (MSB) and the last symbol "A" denotes the least significant bit. Hence, the bit numbering used for the digital image code "LKJIHGFEDCBA" corresponds to "LSB 0," for which the LSB "A" is assigned to the bit number m=0, the binary symbol B is assigned to the bit number m=1, and so forth. Each field that is received by the active-matrix display is divided into 16 sub-fields (e.g. SF1 to SF16) of equal sub-field period. The whole field is further divided into a plurality of time slots of equal time duration. For this example the plurality of time slots comprises N=4096 time slots in total or 256 time slots per sub-field. To each of the time slots is assigned a unique bit number (0-11) or equivalent code symbol (A-L), meaning that the assigned code symbol is driven during that time slot at a display pixel and thus is contributing to the weighting for obtaining a scale of gray that is represented by that code symbol.

Table VI enumerates the sub-fields in ascending order in the first column, the corresponding first driven code symbol in the second column and the corresponding second driven code symbol, if any, in the third column. The number of time slots assigned to the first driven code symbol and the second driven code symbol for each sub-field, respectively, are provided in the fourth column.

TABLE VI

| Sub-field | First driven code symbol | Second driven code symbol | Assigned number of time slots |
|---|---|---|---|
| SF1 | A | L | (1; 255) |
| SF2 | B | K | (2; 254) |
| SF3 | C | L | (4; 252) |
| SF4 | D | J | (8; 248) |
| SF5 | E | L | (16; 240) |
| SF6 | F | K | (32; 224) |
| SF7 | K | L | (34; 222) |
| SF8 | G | J | (64; 192) |
| SF9 | J | L | (72; 184) |
| SF10 | H | L | (128; 128) |
| SF11 | L | 0 | (255; 1) |
| SF12 | K | / | (256; 0) |
| SF13 | L | / | (256; 0) |
| SF14 | K | / | (256; 0) |
| SF15 | L | / | (256; 0) |
| SF16 | I | / | (256; 0) |

Figure 8:
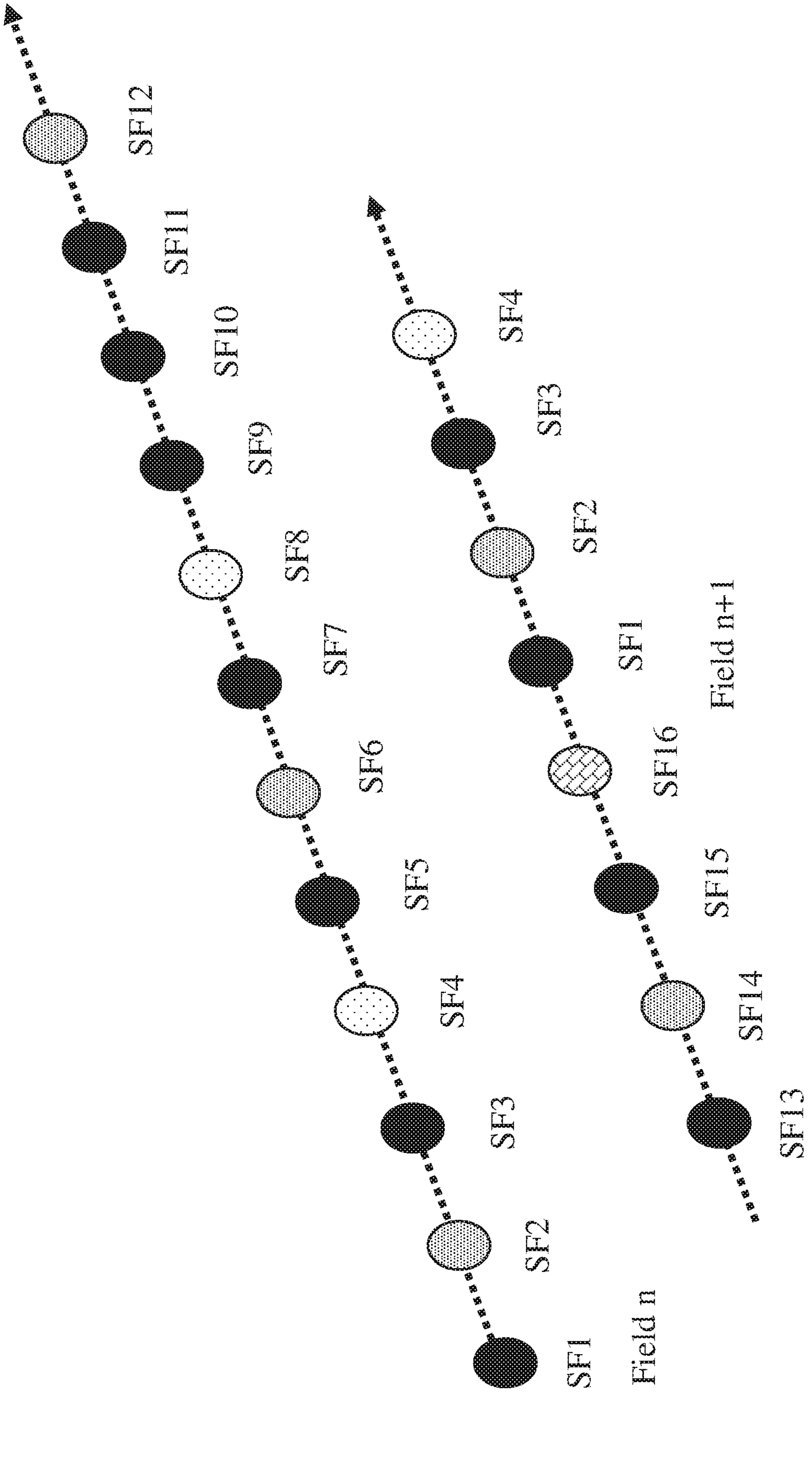
FIG. 8 is a schematic diagram showing a distribution of the bits over the individual sub-fields of a field, using a 12-bit digital image code for driving display pixels, according to an example embodiment.

FIG. 8 shows how the three most significant bits "J," "K," and "L," the three bits of the digital image code that most severely affect the perceived image quality through dynamic false contours in a conventional driving method, are distributed over the different sub-fields SF1-SF16 for each field. More specifically, the bit which is most significant for each sub-field is shown as a circle. A darker filling pattern of a circle corresponds to a sub-field in which the most significant bit "L" is driven, an intermediate, lighter filling pattern of a circle corresponds to a sub-field in which the second most significant bit "K" is driven, and a very light filling pattern of a circle corresponds to a sub-field in which the third most significant bit "J" is driven. The most significant bit "L" is substantially regularly distributed over the sub-fields in each field, e.g. it is present for every second sub-field at least, and is present in more than 50% of all sub-fields comprised in one field, e.g. is present in 56.25% of all sub-fields comprised in one field. Furthermore, the second most significant bit "K" is substantially regularly distributed over the sub-fields in each field, e.g. it is present for every sixth sub-field at least, and is present in more than 12.5% of all sub-fields comprised in one field, e.g. is present in 25% of all sub-fields comprised in one field. Eventually, also the third most significant bit "J" is substantially regularly distributed over the sub-fields in each field, e.g. it is present for every twelfth sub-field at least, and is present in more than 6.25% of all sub-fields comprised in one field, e.g. is present in 12.5% of all sub-fields comprised in one field.

In the above examples, care has been taken to have an increasing delay between the moments in time for which driving of the first driven code symbol and the second driven code symbol is respectively started. In a practical driver circuitry, a decrease in the delay is impractical or would lead to skipping of rows. The delay may be reset to a smaller value if a second code symbol is not driven or if a "0" is driven instead, e.g. the reset of the delay may be carried out during the last sub-field.

The driving of code symbols labelled "0" means that none of the code symbols of the digital image code are driven but a binary zero is written to the display pixel, e.g. the display pixel is operated in an off-state and substantially no light is emitted. For some sub-fields there is no second code symbol driven, because the first driven code symbol is driven for all the time slots in any one of these sub-fields (e.g. all the time slots of any one of these sub-fields are assigned to the same code symbol, which is driven first). This is indicated by a "/" in the respective rows of the third columns.

Figure 9:
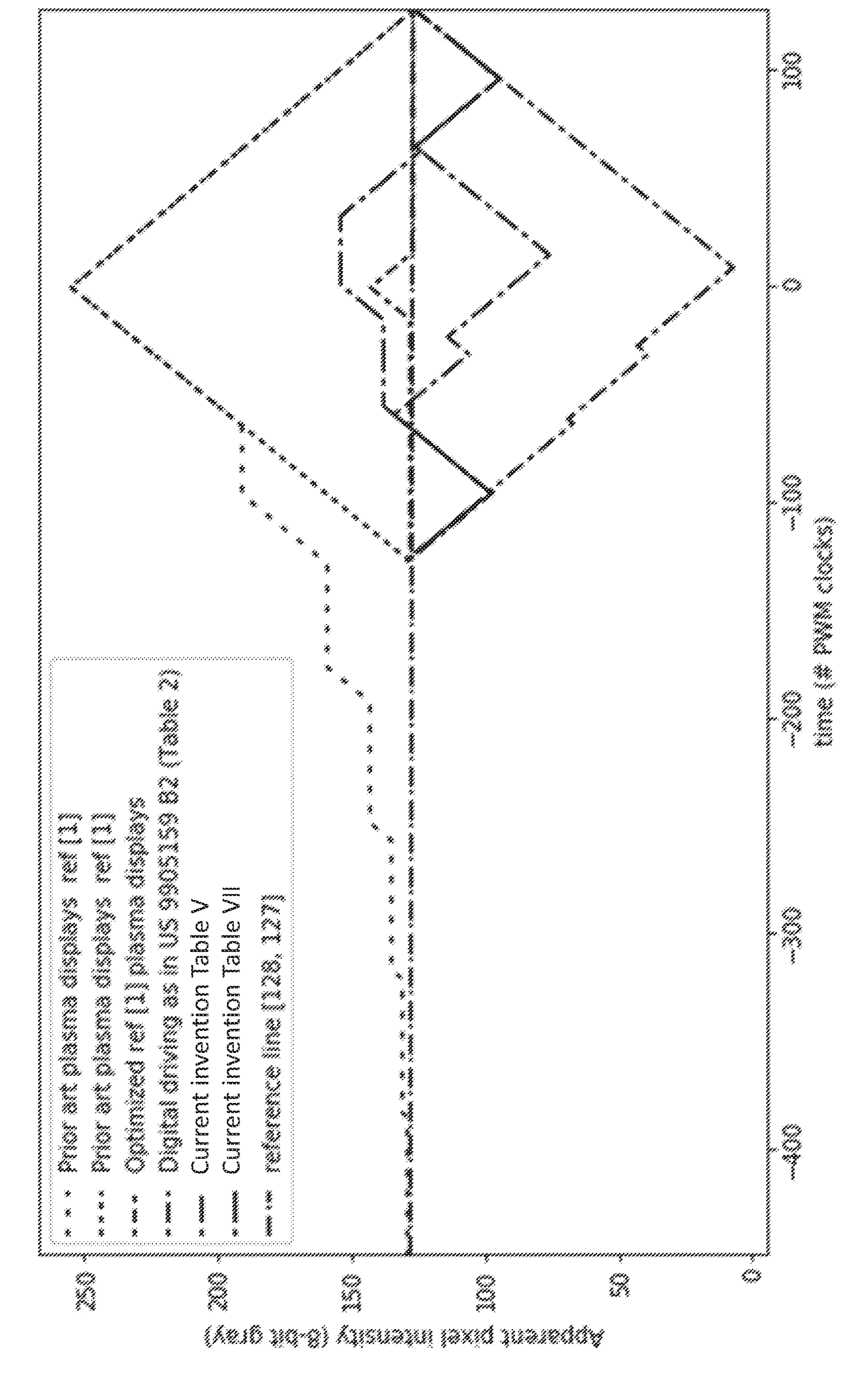
FIG. 9 is a diagram depicting dynamic false contour spread and amplitude as performance measures, according to an example embodiment.
Figure 10:
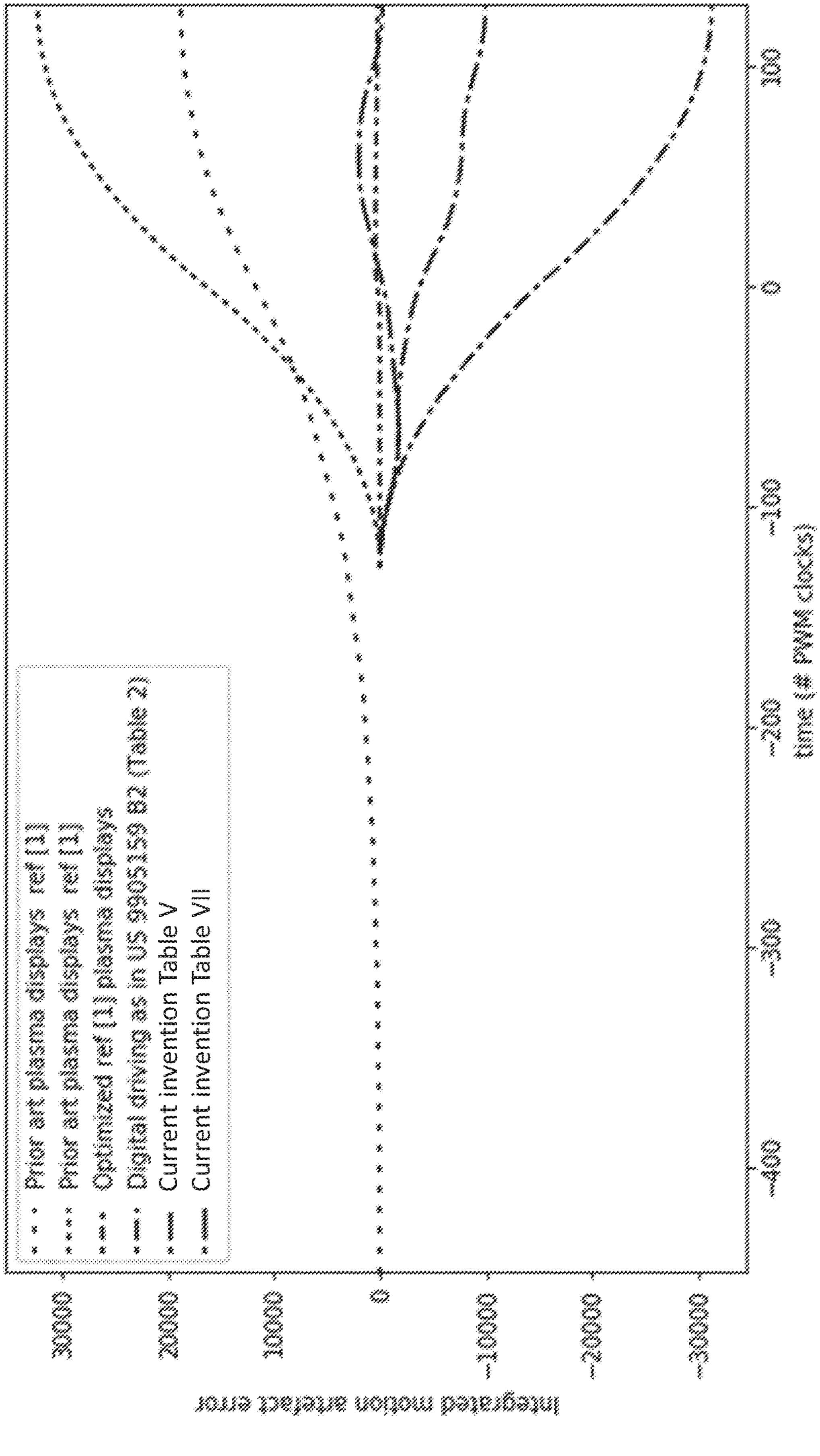
FIG. 10 is a diagram depicting dynamic false contour spread and amplitude as performance measures, according to an example embodiment.

FIGS. 9 and 10 show simulated results for the apparent scale of gray and the integrated apparent scale of gray for an 8-bit depth AMOLED display that would be perceived by an eye-tracking human observer for a laterally moving transition between the two adjacent scales of gray 128 and 127 (e.g. reference line [128,127]). A dynamic false contour amplitude and spread can be read from the curves; both may be used for assessment of the improved image quality. Here, FIG. 9 reports the perceived dynamic false contour amplitude and spread as a function of time, measured in PWM clock cycles, whereas in FIG. 10 the corresponding integrated area under each of the curves of FIG. 9 with respect to the reference line is reported. The upper limit of integration is, again, a function of time, measured in PWM clock cycles. A PWM clock cycle corresponds to the duration of one time slot. The closer to zero each of the curves in FIG. 10, the better the reduction of motion artifacts and the better the resulting viewing quality experienced by an observer. In particular the final value of each curve of FIG. 10 at the right provides a good quality indicator for the purpose of comparing the different methods. If the displacement speed of the gray scale transition is higher or the size on the display over which the transition extends, the same motion artifacts as in FIG. 9 will be visible, but spread over a larger area. The results and performance reported in FIG. 9 may be verified by a pursuit camera for a hardware implementation of the digital driving method, e.g. in a driver circuitry for an active-matrix display panel. Table VII shows an alternative sub-field driving scheme which is a logical combination of two different sub-field driving schemes, each performing better according to the case of having the MSB "H" assigned a zero value, H=0, or a one value, H=1. The combination leads to a further improvement in the reduction of the false contour amplitude. The performance curves for the driving methods in FIG. 9 and FIG. 10 are compared to a known digital driving method, which also selects each row of the display twice in at least one sub-field, but for which the most significant bit is not substantially regularly distributed over the sub-fields of one field. Such a non-optimal driving method has been described in document U.S. Pat. No. 9,905,159 and may be performed according to the assignments of Table VIII, which uses an intuitive assignment of the number of time slots to first driven code symbols or first and second driven code symbols in each sub-field, being the assignment of powers of two. Another base for comparison between digital driving methods according to embodiments of the disclosure and digital driving methods known in the state of the art has been given in FIG. 9 and FIG. 10, wherein reference is made to the performance curves obtained by Yamamoto et al, cited hereinabove.

TABLE VII

| Sub-field | First driven code symbol | Second driven code symbol | Assigned number of time slots |
|---|---|---|---|
| SF1 | A | H | (1; 31) |
| SF2 | C | G | (4; 28) |
| SF3 | D | G OR H | (8; 24) |
| SF4 | H AND G | E | (16; 16) |
| SF5 | H AND G | G OR H | (20; 12) |
| SF6 | H | B | (30; 2) |
| SF7 | H | 0 | (31; 1) |
| SF8 | F | / | (32; 0) |

TABLE VIII

| Sub-field | First driven code symbol | Second driven code symbol | Assigned number of time slots |
|---|---|---|---|
| SF1 | 0 | H | (1; 31) |
| SF2 | A | H | (1; 31) |
| SF3 | B | H | (2; 30) |
| SF4 | C | H | (4; 28) |
| SF5 | H | G | (8; 24) |
| SF6 | D | G | (8; 24) |
| SF7 | E | G | (16; 16) |
| SF8 | F | / | (32; 0) |

In a second aspect, the disclosure relates to a digital driver circuitry for digitally driving the display pixels of an active-matrix display, e.g. an AMOLED display. For such an active-matrix display, a plurality of display pixels are arranged on the display panel, e.g. on the backplane of the panel. The plurality of display pixels are each comprising a light-emitting pixel element, for instance, LED pixel elements or OLED pixel elements such as fluorescent OLEDs, phosphorescent OLEDs, or light-emitting polymers, or Quantum dot LEDs (QLEDs). The display pixels can be logically arranged in rows and columns, whereby the display forms a matrix capable of displaying images in consecutive fields of a certain duration.

Figure 11:
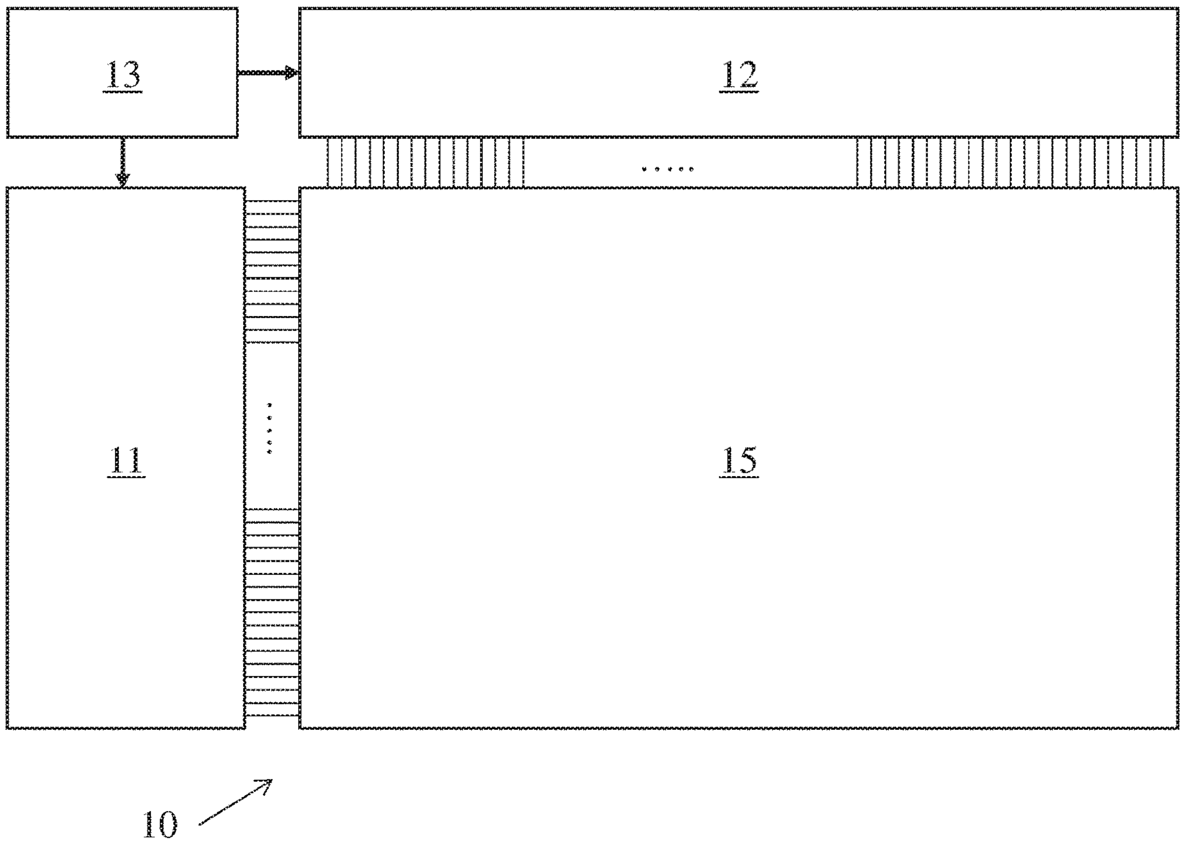
FIG. 11 shows a digital driver circuitry for carrying out a digital driving method, according to an example embodiment.

An exemplary digital driver circuitry 10 is shown in FIG. 11. The digital driving circuitry 10 comprises a digital row select driver 11 for sequentially selecting each of the plurality of rows of the display, and a digital column data driver 12 for writing the digital code symbols to corresponding display pixels in a selected row. The display pixels are arranged in rows and columns on a display panel 15. The digital row select driver 11 is adapted for sequentially selecting, within at least one sub-field, each of the plurality of rows twice. The digital column data driver 12 is adapted to write a first digital code symbol to a selected row, upon a first selection by the row select driver 11, and to write a second digital code symbol to the same selected row, upon a second selection by the row select driver 11. A predetermined time delay between the moment of the second selection and the moment of the first selection for the at least one sub-field is larger in time duration than one time slot of that sub-field. The digital driving circuitry 10 also includes a controller 13 for synchronizing the row select driver 11 and the column data driver 12 and for generating the first digital code symbols or the first and second digital code symbols to be driven during a sub-field at the display pixels of a selected row. Moreover, the controller is adapted to generate the digital code symbols in such a way that the most significant bit is substantially regularly distributed over the sub-fields in a field. The controller 13 may further be configured for receiving a video signal, for processing it, e.g. by performing frame rate conversion, and for generating the timing control for pulse width modulation. An exemplary row select driver 11 may generate a first and a second select signal under the form of a first running one and a second running one. A first running one, for example, may be advancing by one position in a first shift register or a first linear array of D-flip-flops at every clock pulse. Likewise, a second running one may be advancing by one position in a similar, second shift register or a similar, second linear array of D-flip-flops at every clock pulse, but with a delay corresponding to a predetermined number of clock pulses with respect to the first running one.

In a further aspect, the disclosure relates to an active-matrix display, e.g. an AMOLED, AMLED or AMQLED display, comprising a plurality of display pixel elements logically organized in rows and columns, a plurality of row bitlines and data bitlines respectively connected to the display pixel rows and columns, and a digital driver circuitry according to embodiments of the second aspect of the disclosure. Each display pixel is arranged at an intersection of a row bitline and a data bitline such that the display pixel, when addressed by a row select signal applied to that row bitline, is receiving a digital code symbol applied to that data bitline. Receiving of a digital code symbol for the addressed display pixel is triggered by the row select signal. A received digital code symbol causes the light-emitting pixel element of an addressed display pixel to emit light over a predetermined number of time slots in a sub-field (this number of time slots can be zero if the received digital code symbol also represents a zero). The digital driver circuitry is connected to the plurality of row bitlines and the plurality of data bitlines and is providing the row select signals to be applied to the row bitlines and the digital code symbols to be applied to the data bitlines.

While the disclosure has been illustrated and described in detail in the drawings and foregoing description, such illustration and description are to be considered illustrative or exemplary and not restrictive. The foregoing description details certain embodiments of the disclosure. It will be appreciated, however, that no matter how detailed the foregoing appears in text, embodiments may be practiced in many ways.

Other variations to the disclosed embodiments can be understood and effected by those skilled in the art, from a study of the drawings, the disclosure and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for reducing motion artifacts in moving image sequences displayed on a digitally driven active-matrix display comprising a plurality of display pixels logically organized in a plurality of rows and a plurality of columns, the method comprising:

representing each of a plurality of dots of an image to be displayed within a field by an n-bit digital image code, n being greater than 4, dividing the field into a plurality of sequential, time-ordered sub-fields equal in duration, each sub-field being further divided into a first time interval and a second time interval respectively comprising a first number and a second number of equally long time slots, assigning a number of time slots to each bit of the n-bit digital image code according to each bit’s significance in the digital image code, such that, for each but one sub-field, successive time slots of the first time interval are assigned to one of the bits of the digital image code, to be written during the first time interval of the sub-field, and successive time slots of the second time interval are assigned to a different one of the bits of the digital image code, to be written during the second time interval of the sub-field, within a duration of at least one sub-field, sequentially selecting each of the plurality of rows twice, wherein upon a first selection a first bit of the digital image code is written to the selected row during the first time interval and upon a second selection a second bit of the digital image code, different from the written first bit of the digital image code, is written to the selected row during the second time interval, there being a predetermined time delay between moments of first and second selection, wherein the plurality of sub-fields consists of a first group of sub-fields and a second group of sub-fields, wherein a most significant bit of the digital image code is present in each subfield of the first group of sub-fields and not present in any subfield of the second group of sub-fields, the plurality of sub-fields being arranged chronologically such that a total number of sub-fields of the second group that are consecutive in time is minimized.

2. The method according to claim 1, wherein the most significant bit and a second most significant bit of the digital image code are each written during time intervals which are substantially regularly distributed over the sub-fields comprised in one field.

3. The method according to claim 2, wherein the most significant bit, the second most significant bit and a third most significant bit of the digital image code are each written during time intervals which are substantially regularly distributed over the sub-fields comprised in one field.

4. The method according to claim 1, wherein the most significant bit of the digital image code is written during time intervals associated with more than 50% of the sub-fields comprised in one field.

5. The method according to claim 1, wherein the delay between the first selection and the second selection in the at least one sub-field is equal or less than the delay between the first selection and the second selection in any further subsequent sub-field.

6. The method according to claim 1, wherein a number of sub-fields comprised in one field equals a power of two.

7. The method according to claim 1, wherein each sub-field comprises an equal number of time slots.

8. The method according to claim 1, wherein the second number of time slots in a second time interval of at least one sub-field is zero and only one bit of the digital image code is written during the at least one sub-field.

9. The method according to claim 1, wherein writing the bit of the digital image code during the first interval and writing the second bit of the digital image code during the second interval comprises driving the bits using pulse-width modulation.

10. A digital driver circuitry for driving display pixels of an active-matrix display arranged in rows and columns, the digital driver circuitry comprising a digital row select driver for sequentially selecting each one of a plurality of rows for each sub-field in a plurality of sub-fields of equal duration comprised in a field to be displayed at a first time and for sequentially selecting each one of a plurality of rows for at least one sub-field at a second time, there being a delay between a first selection of a row at the first time and a second selection of that same row at the second time, wherein the plurality of sub-fields consists of a first group of sub-fields and a second group of sub-fields, a digital column data driver for writing bits of an n-bit digital image code to corresponding display pixels of a selected row, a first bit of the digital image code being written during a first interval upon a first selection of a row and a second bit of the digital image code, different from the written first bit, being written upon a second selection of that same row, n being greater than 4, and a controller for synchronizing the digital row select driver and the digital column data driver, the controller being adapted for generating the first bit of the digital image code to be written within each sub-field or generating the first bit and second bit of the digital image code to be written within the at least one sub-field of the field, such that a most significant bit of the digital image code is present in each subfield of the first group of sub-fields and not present in any subfield of the second group of sub-fields, the plurality of sub-fields being arranged chronologically such that a total number of sub-fields of the second group that are consecutive in time is minimized.

11. The digital driver circuitry according to claim 10, wherein the digital row select driver comprises at least two shift registers or at least two linear arrays of clocked flip-flops.

12. An active-matrix display comprising a plurality of display pixels arranged in rows and columns, a plurality of row bitlines and data bitlines, each display pixel being connected to one of the row bitlines and one of the data bitlines, wherein the active-matrix display further comprises a digital driver circuitry according to claim 10, the digital driver circuitry being connected to the each of the plurality of row bitlines and each of the plurality of data bitlines.

13. The method of claim 4, wherein a second most significant bit of the digital image code is written during time intervals associated with at least 25% of the sub-fields comprised in one field.

14. The digital driver circuitry according to claim 10, wherein the most significant bit and a second most significant bit of the digital image code are each written during time intervals which are substantially regularly distributed over the sub-fields comprised in one field.

15. The digital driver circuitry according to claim 14, wherein the most significant bit, the second most significant bit and a third most significant bit of the digital image code are each written during time intervals which are substantially regularly distributed over the sub-fields comprised in one field.

16. The digital driver circuitry according to claim 10, wherein the most significant bit of the digital image code is written during time intervals associated with more than 50% of the sub-fields comprised in one field.

17. The digital driver circuitry according to claim 10, wherein the delay between the first selection and the second selection in the at least one sub-field is equal or less than the delay between the first selection and the second selection in any further subsequent sub-field.

18. The digital driver circuitry according to claim 10, wherein a number of sub-fields comprised in one field equals a power of two.

19. The digital driver circuitry according to claim 10, wherein each sub-field comprises an equal number of time slots.

20. The digital driver circuitry according to claim 10, wherein a second number of time slots in a second time interval of at least one sub-field is zero and only one bit of the digital image code is written during the at least one sub-field.

* * * * *